No. 771,797. PATENTED OCT. 4, 1904.
A. HEBERER & H. A. HYNE.
TUBULAR STEAM BOILER.
APPLICATION FILED MAY 19, 1903.
NO MODEL. 5 SHEETS—SHEET 1.
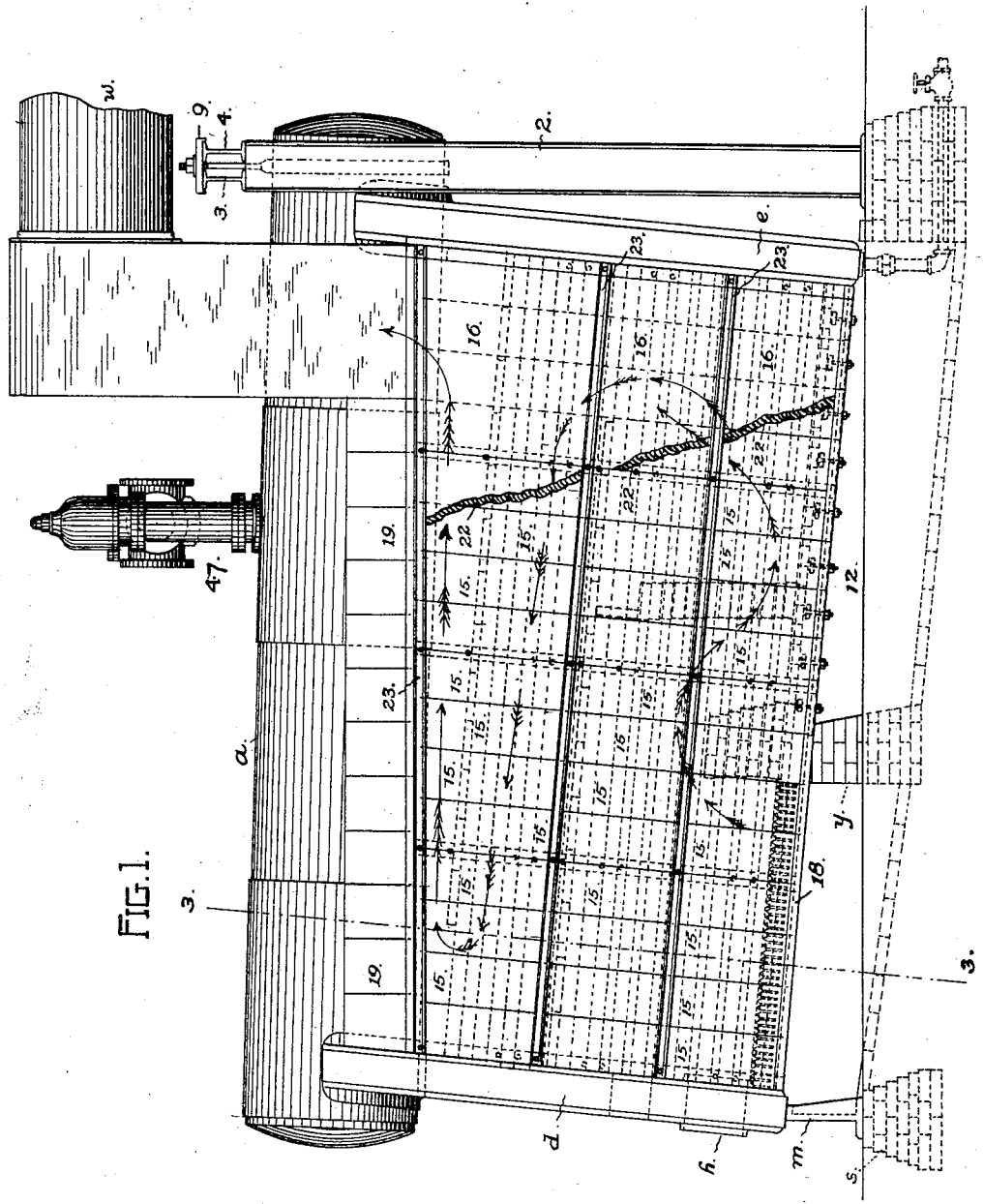
WITNESSES
M. Regner
F. G. Osborn
INVENTORS
Adam Heberer
Henry A. Hyne
By E. G. Osborn
their Atty

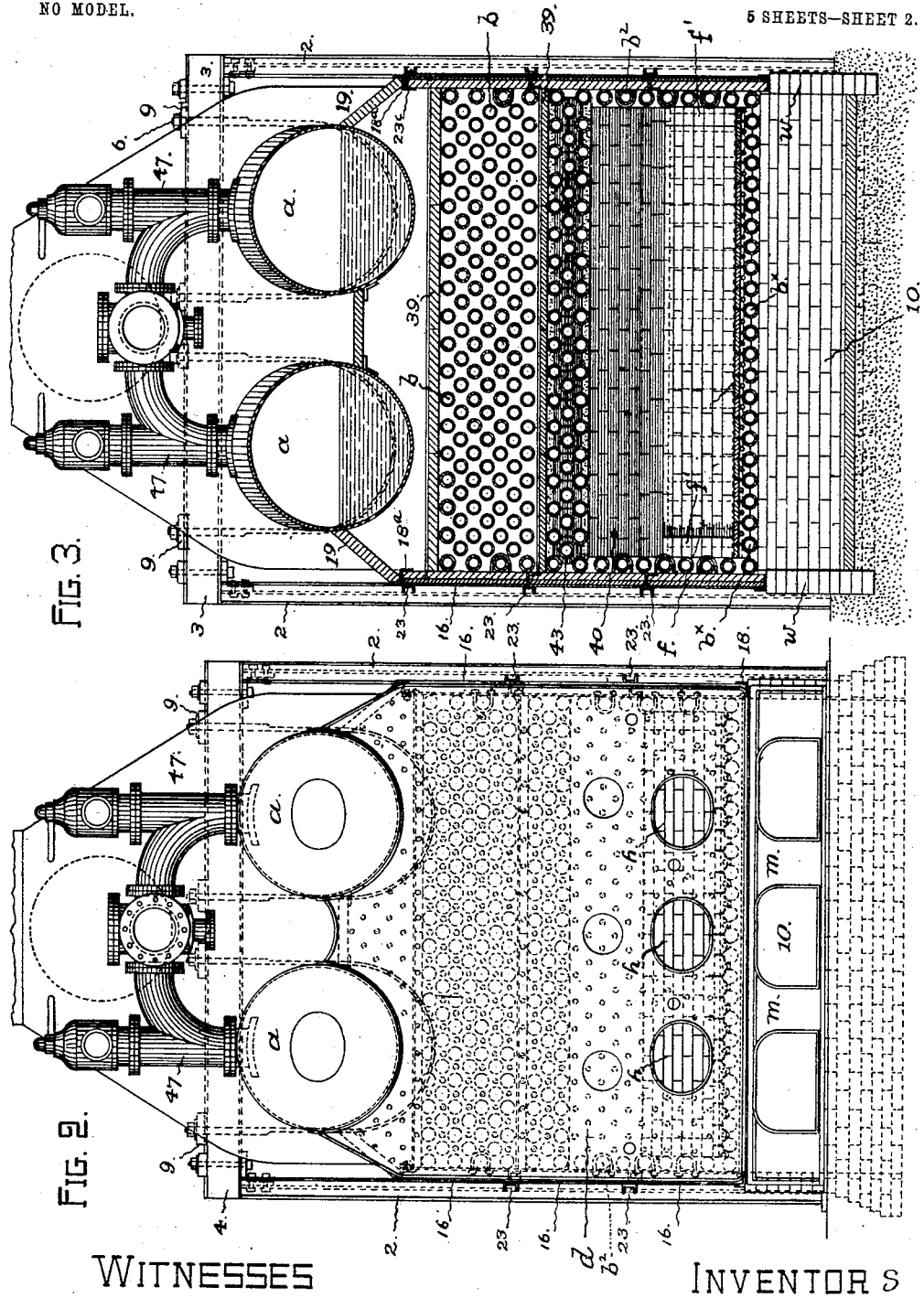

No. 771,797. PATENTED OCT. 4, 1904.
A. HEBERER & H. A. HYNE.
TUBULAR STEAM BOILER.
APPLICATION FILED MAY 19, 1903.
NO MODEL. 5 SHEETS—SHEET 3.
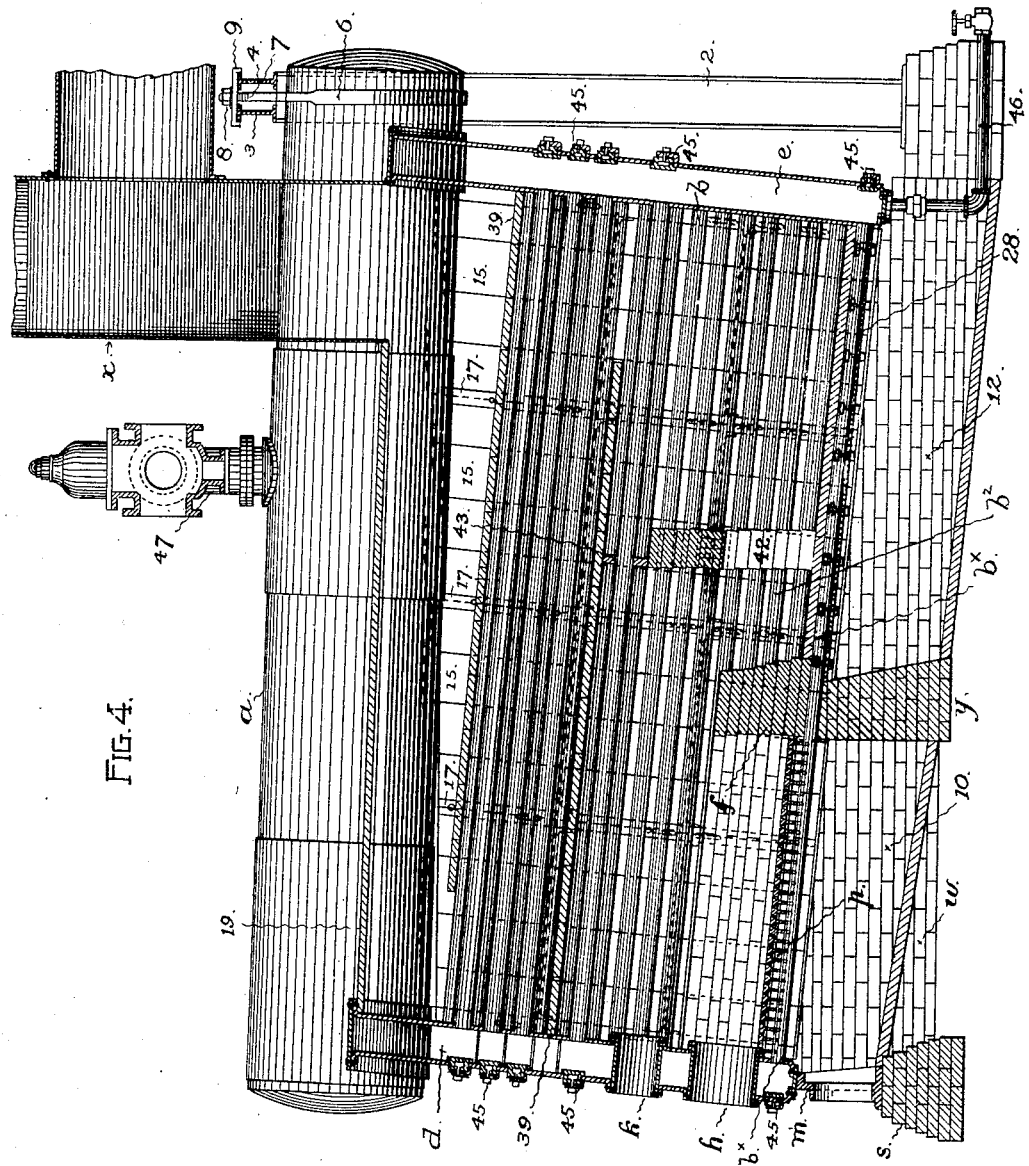
WITNESSES
M. Regner
F. G. Osborn
INVENTORS
Adam Heberer
Henry A. Hyne
By E. E. Osborn
their Atty.

No. 771,797. PATENTED OCT. 4, 1904.
A. HEBERER & H. A. HYNE.
TUBULAR STEAM BOILER.
APPLICATION FILED MAY 19, 1903.
NO MODEL. 5 SHEETS—SHEET 4.
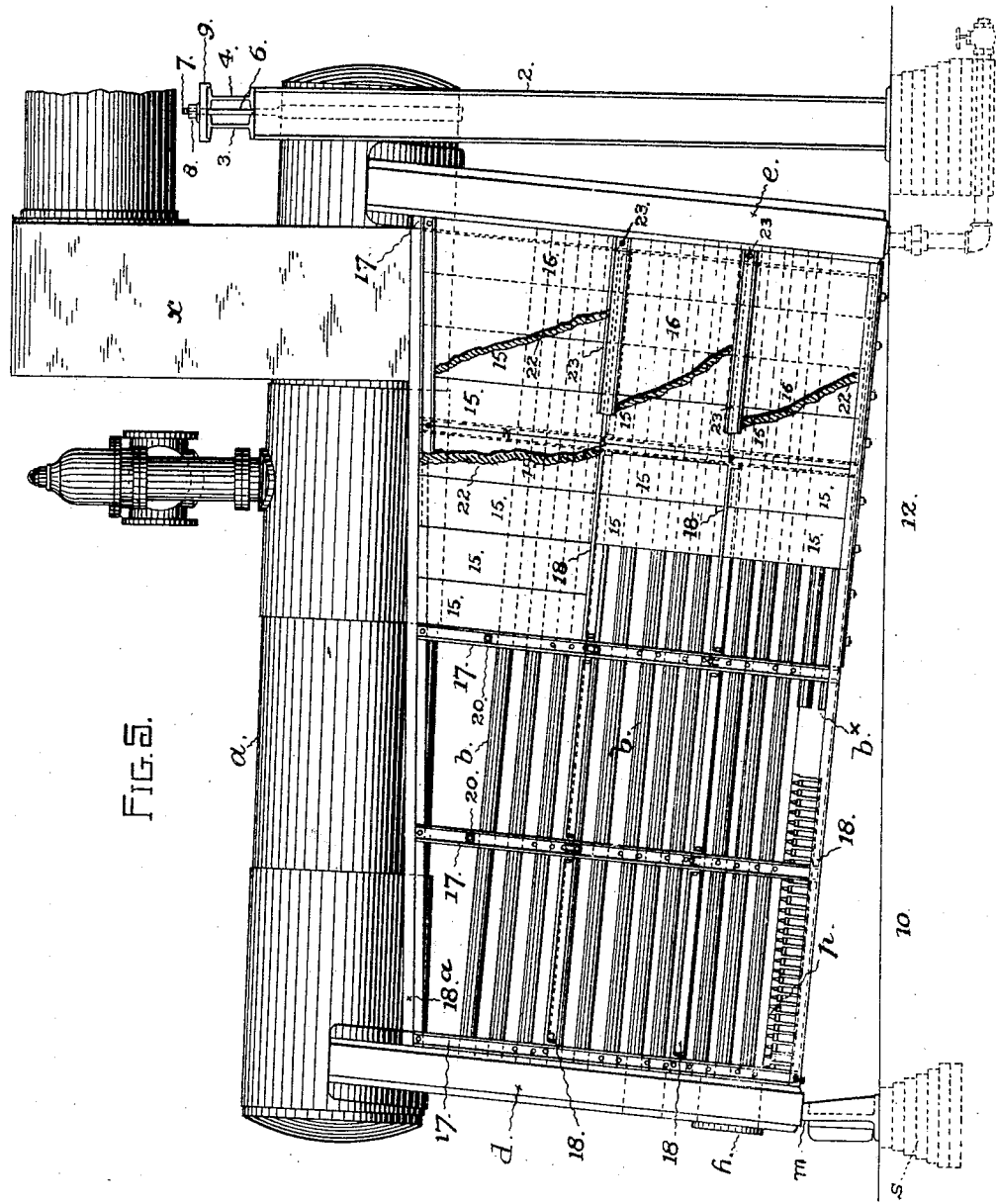
WITNESSES
M. Regner
F. G. Osborn
INVENTORS
Adam Heberer
Henry A. Hyne
By C. E. Osborn
their Atty.

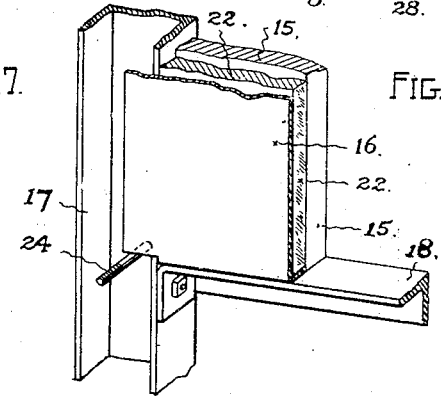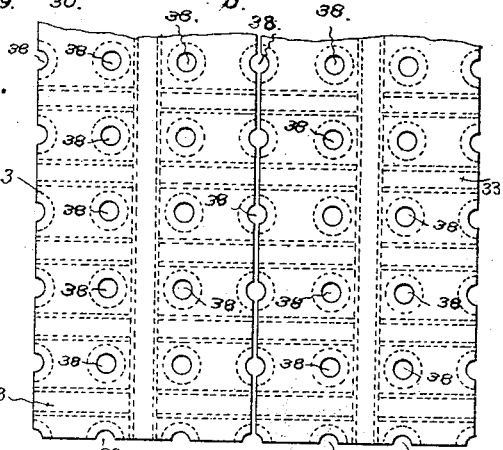

No. 771,797.

Patented October 4, 1904.

UNITED STATES PATENT OFFICE.

ADAM HEBERER, OF ALAMEDA, AND HENRY A. HYNE, OF BELMONT, CALIFORNIA.

TUBULAR STEAM-BOILER.

SPECIFICATION forming part of Letters Patent No. 771,797, dated October 4, 1904.

Application filed May 19, 1903. Serial No. 157,867. (No model.)

*To all whom it may concern:*

Be it known that we, ADAM HEBERER, a citizen of the United States, residing at Alameda, in the county of Alameda, and HENRY A. HYNE, a subject of the King of Great Britain, residing at Belmont, San Mateo county, State of California, have invented new and useful Improvements in Tubular Steam-Boilers, of which the following is a specification.

This invention relates to improvements made in the construction of that type of steam-boiler in which the flames and gases are carried in contact with the outside of the tubes while the water circulates through them.

The invention has for its object to improve the construction in several respects, and chiefly in the features of preventing loss of heat by radiation, of controlling the gases and products of combustion in such manner as to secure the most effective results, and of allowing access to all the interior parts and surfaces for inspection, cleaning, or repairs.

The brickwork setting heretofore employed to close in the upright sides of the boiler is dispensed with and, with the exception of a base or foundation-piers and the usual lining for the furnace, no brickwork is employed, but the space containing the water-tubes and including the fire-chamber and combustion-chamber is inclosed by a shell or body constructed of removable panels or sections supported by a skeleton frame.

The panels or sections are removable, and by detaching and taking off one or more of them at any desired part the tubes and surfaces can be reached for cleaning or repairing any part of the boiler.

The grate-surface is of novel construction, chiefly in having the grate-bars carried by water-tubes that form the bottom of the fire-chamber, and the sides, as well as the front and the top of the fire-chamber, are composed of water-tubes. In this part of the boiler special attention has been given in our construction to secure the most effective application of the heat to the water-tubes and the least amount of loss by radiation.

The nature of these improvements and the application of the same in the construction of our improved tubular boiler are fully explained and set forth in the following description, and pointed out in the claims at the end of this specification, in which reference is had to the accompanying drawings, forming part thereof.

Figure 1 of the drawings is a general exterior view of a tubular steam-boiler embodying our improvements and having two circulating-drums or "main shells," as they are sometimes called. Fig. 2 is a front elevation. Fig. 3 is a transverse section looking toward the rear of the boiler, the section being taken on the line 3 3 in a plane perpendicular to the inclined water-tubes. Fig. 4 is a vertical section taken longitudinally through the fire-chamber and the tube-inclosing space below the main shells or circulating-drums. Fig. 5 is a side elevation showing the panels and non-conducting lining removed from the side of the fire-chamber and from a portion of the tube-containing space. Fig. 6 is a vertical cross-section, on an enlarged scale, taken through the combustion-chamber in a plane perpendicular to the water-tubes. Fig. 7 is a perspective view, on an enlarged scale, showing details of the framework, removable tiles, panels, and non-conducting lining composing the shell. Fig. 8 is a top view of a section of the grate-surface. Fig. 9 is a side view of a portion of one of the grate-bars and its supporting-tube. Fig. 10 is a front view, on an enlarged scale, of a portion of the grate-surface, showing the ends of two grate-bars and the water-tubes on which they rest.

Following the best features employed at the present time in the construction of tubular boilers, such as the Heine boiler and others of that type, the main shells $a$ when the construction includes two shells and the water-tubes $b$ pitch with a slight inclination to the rear, and the water-tubes and main shells are connected both at the front and rear ends by water-legs $d\ e$, through which the whole set of water-tubes communicate with the main shell at both ends of the structure. The water-tubes occupy the entire space under the main shell with the exception of the lower portion of the space, where the intermediate tubes in several of the courses above the bottom course $b^x$ are omitted, as seen in Figs. 3 and 4, to provide proper area for the fire-chamber forward of the bridge-wall $f$ and the combustion-chamber between the bridge-wall and the rear end of the boiler. The tubes $b^x$ comprising the bottom course are carried from the rear end to the front water-leg, and the outer tubes $b^2$ in all the courses are retained on both sides of the fire-chamber and the combustion-chamber for the entire length of the boiler. The lower courses of the tubes $b^2$ where they extend through the combustion-chamber are preferably separated from the burning fuel by the fire-brick lining $f'$. The bottom and the sides, as well as the top, of the fire-chamber and combustion-chambers are thus inclosed by water-tubes running the full length of the boiler and connecting at the ends with the water-legs $d\ e$. Both water-legs extend from the main shell downward to the bottom course of tubes, and the front water-leg $d$ also forms the entire front plate of fire-chamber, being provided with fuel-openings $h$, properly framed for doors to cover the openings, and where feed-water heating attachments or devices for introducing air above the grate-bars are employed the additional openings $k$ in the front are provided for them. The water-tubes are flanged in the usual manner in the inner tube-sheet of the leg, and in the outer sheet or front plate are openings closed by caps or stoppers 45, through which access is provided from the outside for cleaning out the tubes.

The front leg of the boiler rests upon a casting $m$, that closes in and forms the front plate of the ash-pit 10, and that plate in turn is supported by several courses of brickwork $s$. This construction of boiler-front dispenses with the cast-iron front commonly used in boilers of this type and is an important feature in reducing the cost of the boiler. Provision is made, however, for the contraction and expansion of the metal due to changes of temperature by suspending the rear end from a fixed support instead of fixing the end of the rear water-leg on a stationary base. Similar provision for contraction and expansion is made in boilers of this type by setting the rear end of the boiler on roller-bearings, and while this feature is not broadly new in our present construction the means for carrying the weight of the structure at the rear end which we have provided is believed to possess several advantages over other ways heretofore employed to accomplish the same end.

The construction of the support for the rear end of the boiler will be understood by referring to Figs. 3, 4, and 5 of the drawings. The uprights 2 2 and two beams 3 4 of T-iron laid across their tops form a gallows-frame in which the end of the boiler is suspended by straps 6, passed under the main shells $a\ a$ and attached at the ends to the cross-beams, which are set apart sufficiently to admit the straps between them. The straps having ends 7, threaded for nuts 8, are passed from below upward through holes in saddle-pieces 9, laid across the beams, and the straps are drawn up and fastened by screwing on the nuts. The entire weight of the rear end of the boiler is thus carried by the gallows-frame and being suspended from the cross-beams the operation of setting up the boiler and adjusting its inclination is made comparatively easy, particularly as the bed or foundation at the front is the only one on which the boiler rests directly.

Room for the ash-pit 10 under the grate and for an inspection-pit 12 under the bottom of the boiler in the rear of the bridge-wall is provided by excavating below the ground-level or by carrying up the brick foundation at the front and rear to the required height for that purpose. The sides of the ash-pit are inclosed by brickwork $w$, and the inspection-pit in the rear of the bridge-wall is left open at the sides or is inclosed in the same manner, according to the character or position of the boiler.

In a stationary boiler the space between the floor-line or ground-line and the bottom of the boiler on both sides is inclosed by brickwork, as shown in Fig. 4; but for marine purposes only the sides of the ash-pit are inclosed, and the sides of the pit under the combustion-chamber are usually left open for circulation of air between the bottom of the boiler and the floor beneath, as seen in Fig. 1.

A brickwork pier $y$ closes the back of the ash-pit and also forms a transverse support under the center of the boiler, and being situated under the bridge-wall it also furnishes a foundation for that part.

On the sides of the boiler below the main shell a skeleton framework of angle-iron bars 17 and rails 18, of the same material, fixed at right angles to the bars, is permanently secured to the main shells and the water-legs. The bars 17 have the same inclination as and are parallel with the water-legs, while the rails 18, running from front to rear, are parallel with the water-tubes and perpendicular to the bars 17 with the exception of the topmost rail $18^a$, which is set approximately horizontal for the double purpose of furnishing a support for a set of inclined slabs or tiles 19, that close in the space between the main shells and the top of the side walls, and for confining the top ends of the uppermost row of tiles and panels. In the construction shown in the drawings the skeleton frame on each side divides the space into twelve sections, each containing the same number of slabs, and those comprising a section are covered by a single panel; but the number and the dimensions of the sections being obviously susceptible of change, as occasion or as the size of the boiler may call for, the number and arrangement of the rails and bars composing the skeleton frame will vary to conform to the size of the tiles and panels or to other conditions.

The longitudinal rails 18 are bolted at the ends to the bars or the water-legs and to the other bars, which are formed of channel-iron, and at intervals in the length of the channel-irons tie-rods 20 extend transversely through the spaces between the tubes from one side to the other to stiffen the framework, the ends of the tie-rods being carried through the bars and secured by nuts on the outside.

The piers under the front and rear ends and under the bridge-wall and the few courses that are required to close in the sides of the pits between the ground-line and the bottom of the grate-surface and combustion-chamber are the only exterior brickwork in this boiler comprising what is generally understood as the "boiler-setting."

In all tubular boilers of this type, so far as we are aware, the main shell or shells, the water-tubes, and the connecting water-legs constituting the metal portion of the structure require to be inclosed by brickwork extending from the bottom to the top and over the main shells in order to complete the structure, and to accommodate this setting it becomes necessary to provide room at the sides of the boiler beyond that which is taken up by the width of the metal portion of the structure. In some cases also where the space allowed for the boiler is limited to a fixed area, as in marine work, it is found difficult if not impossible to use walls of proper thickness at all parts or sections to secure the most effective operation and efficiency of the boiler.

In our new construction of boiler the sides inclosing the tubes and other parts of the shell and confining the gases and products from the fire-chamber are of such character that they take up much less space than that demanded by the thickness of the brickwork setting, and they are made, besides, an integral part of the structure to such an extent that the boiler when finished in the shop is complete in itself, with the exception of the few courses of brickwork that form stationary supports for the ends of the boiler and inclose the sides of the pits. The sides of the shell from the water-leg $d$ at the front to the corresponding one $e$ at the rear are composed of removable slabs or tiles 15 of fireproof material made in sections of rectangular shape and of a convenient size for handling, and these are covered by metal panels 16 of the same shape and of such larger dimensions that one panel will cover and close the joints between several tiles in the same row. The bars 17 are further secured by clips or straps 21, placed around the outermost water-tubes lying next the tiles, and the ends of the straps are passed through holes in the bar 17 and fastened by nuts. In each section the bottom ends of the slabs 15 rest on the angle-iron bar and their top ends fit closely under the corresponding bar above. The bars have sufficient width of surface to support the metal panel and to afford, besides, room between the slabs and the panels for a lining or packing 22 of some non-conducting substance or material, such as magnesia. This lining is confined in place by the metal panel, the edges of which are turned in at right angles at top and bottom, so as to fit closely against the cross-rail and lie under the lining material, as seen in Fig. 7. The latter being made in sheets or sections to conform to the dimensions of the metal panel, it is the more easily removed and replaced with the panel to give access to the slabs whenever it is desired to open the side of the boiler and reach the parts inside. This construction is shown more particularly in Figs. 5, 6, and 7. The slabs are covered and held in place by the metal panels 16, and those in turn are confined at top and bottom by means of a slat 23 so laid as to overlap the adjacent edges of the panels in one section and those above. The slats 23 are held by stay-bolts 24, fixed in the channel-irons, and nuts 25, so as to be loosened when any of the panels are to be removed. When drawn to place by screwing up the nuts, the slats 23 press the inturned edges of the panels against the tiles at top and bottom and bring the latter closely against the outer row of tubes. When the channel of the bar 17 is filled with magnesia, which is usually done after each bar is secured to the tubes in order to prevent loss of heat by radiation, the panels should be made of proper width to meet together and form butt-joints over the center line of the bar from opposite sides. Suitable stiffness without excessive weight is secured in the slats 23 by using angle-iron instead of flat bar-iron. A sectional siding constructed in this manner has several advantages over the ordinary brickwork setting, particularly in giving ready access to the tubes for inspection and for cleaning the external surfaces, in preventing loss of heat by radiation, and in adding but little to the dimensions of the boiler in width. A covering of similar character is provided for the course of tubes that form the bottom of the combustion-chamber, where the space beneath them is left uninclosed, as in a marine boiler, and in such case the exposed sides of the tubes are covered with a layer of magnesia held in place by sheet-metal plates 28, which are in turn drawn up and fastened in place by bolts 29 and nuts 30. Figs. 4 and 6 illustrate the manner of holding the non-conducting covering against the tubes. The bolts 29 are suspended in the spaces between the tubes by blocks 31, with taper sides to fit the tubes and having holes for inserting the bolts. Access to the bottom tubes is thus given, as well as to those on the sides of the boiler, by having the plates detachable in this manner. The same construction can also be employed to advantage for closing in the sides of the boiler.

The bottom course of tubes extending forward of the bridge-wall support the grate-bars, and in the construction of this part of the boiler we place the grate-bars in direct contact with the water-tubes by utilizing the latter as a part of the fuel-supporting surface in such manner that the heat taken up by the bars is absorbed by the water in the tubes instead of being lost by radiation or expended to no purpose in heating the ash-pit, while the upper surface of the tubes is at the same time protected from the fire by the grate-bars. For such purpose the grate-bars are constructed in sections, each comprising a top plate 33, which is the fuel-supporting surface, and depending legs 34, extending transversely of the grate at regular distance apart and shaped to rest on and conform to the adjacent curved sides of two tubes. A longitudinal rib 36 under the top plate intersects and unites the legs from front to rear to contribute strength and stiffness to the grate-bar and prevent warping. Apertures 37 for draft are arranged at intervals apart in lines lengthwise and crosswise in the top plate, and slotted openings 38 in the legs directly under the top plate inclosed by the legs connect the air-conducting spaces between the legs one with another and give ample circulation of air under the top plate of the bars, lengthwise as well as transversely. The general trend of the gases from the fire-chamber to the stack $x$ is parallel with the tubes, and the tube-containing space is divided for that purpose by partitions formed of slabs 39, inserted from the side of the boiler on the topmost course of tubes, and also on lower courses at a distance below, so as to divide the space above the bridge-wall into longitudinal passages that communicate one with the other alternately at the front and rear ends. The space between the lowest partition and the bottom of the structure is divided perpendicularly by a deflecting arch or wall 40, set in the combustion-chamber behind the bridge-wall and having a solid breast 41, with openings 42 below it for passage of the gases to the rear. Usually the top of the breast is carried up to the bottom of the tubes in the lowest course, and the spaces between the top of the deflecting-wall and the partition above are closed by tiles 43 placed between the tubes. These tubes are shaped to fit the spaces between the courses of the tubes above the deflecting-arch and are readily introduced and set in place from the side of the boiler before the panels are set. This construction is shown in Figs. 4 and 6. The general travel of the gases through the combustion-chamber and the passages leading upward is indicated by the arrows in Fig. 1.

Where the boiler is provided with two circulating-drums $a$, as shown in Figs. 2 and 3, the drums are connected by the usual coupling-pipe 47, having flanges for connecting the steam-pipes. The rear water-leg is provided with a blow-off pipe 46 at the lowest point to clean out the tubes and water-leg and with other well-known parts and attachments necessary to complete the boiler and put it in working condition.

Having thus fully described our invention, what we claim as new therein, and desire to secure by Letters Patent, is—

1. In a tubular boiler the combination of a main shell or shells, water-legs at the front and rear ends connected thereto, a plurality of parallel water-tubes connecting the front and rear water-legs, said water-tubes inclosing and forming the bottom and the sides of a fire-chamber at the front and a combustion-chamber in the rear of it, a bridge-wall separating the fire-chamber and combustion-chamber, grate-bars supported directly on the water-tubes between the bridge-wall and the front water-leg and means for inclosing the sides of the structure between the main shell and the water-legs, comprising a skeleton frame dividing the space into sections, removable tiles closing each section and removable panels adapted to confine the tiles in place.

2. In a tubular boiler of the character described having a main shell, water-legs at the ends of the shell and water-tubes connecting said water-legs; the combination of means for closing the sides of the boiler, comprising spaced bars and cross-rails forming a sectional frame, removable tiles fitted in the sections, of the frame and supported by the cross-rails thereof and removable panels adapted to cover the tiles and confine the same in place.

3. In a tubular boiler having a main shell, water-legs and connecting water-tubes, the combination of the sectional frame composed of parallel bars extending from top to bottom and longitudinal rails dividing the space between the water-legs into sections, removable tiles fitted in the sections and closing in the space, and removable panels covering the tiles and extending beyond the edges thereof and each covering a portion of the skeleton frame.

4. In a water-tube boiler, the combination of a skeleton frame arranged outside the water-tubes and formed of bars crossing each other to form separate sections, and a set of removable tiles each fitting in one of the sections of the skeleton frame, the bars of the frame serving to surround the tiles and separate them one from the other, and means for holding the tiles in the sections of the frame, substantially as set forth.

5. In a water-tube boiler, the combination of a skeleton framework arranged outside the water-tubes, means for securing the framework to the boiler-tubes and a set of removable panels formed in sections secured to the said skeleton framework and arranged to form a tight inclosing shell for the boiler, substantially as set forth.

6. In a tubular boiler, the combination of a steam-generating shell comprising front and rear water-legs, a main shell or circulating-drum connected therewith, and water-tubes connecting the water-legs; of removable panels in sections inclosing the sides of the shell and a skeleton frame adapted to support said panels, said frame comprising bars fastened to the outer tubes along the sides of the shell and longitudinal rails secured to said bars at intervals apart perpendicularly of the shell.

7. In a tubular boiler, the combination with water-tubes arranged in parallel rows, of a gas-tight non-conducting covering comprising slabs laid edge to edge, metal panels covering the slabs, a lining of non-conducting material between the slabs and the panels and fastening devices removably securing the panels in place.

8. In a tubular boiler of the character described, a combustion-chamber having its bottom composed of water-tubes in spaced rows, and a removable external covering for the exposed sides of the tubes, comprising a filling of incombustible non-conducting material, a sheet-metal panel covering said filling and fastening devices removably holding the filling in place.

9. In a tubular boiler, a non-conducting covering for the exposed surfaces of the outermost tubes comprising a filling of incombustible non-conducting material laid over the tubes, a metal panel covering the filling, and means for securing the panels in place consisting of wedge-shaped blocks fitted between the tubes and the bolts and nuts.

ADAM HEBERER.
HENRY A. HYNE.

Witnesses:
  GEO. T. KNOX,
  EDWARD E. OSBORN.